(12) United States Patent
Watanabe et al.

(10) Patent No.: US 6,990,966 B2
(45) Date of Patent: Jan. 31, 2006

(54) HEATER UNIT FOR A COMBUSTION-STABILIZING DEVICE AND A COMBUSTION STABILIZING DEVICE INCLUDING THE SAME

(75) Inventors: Kenji Watanabe, Hitachi (JP); Hiroaki Saeki, Hitachinaka (JP); Kiyoshi Amou, Niihari (JP)

(73) Assignees: Hitachi, Ltd., Tokyo (JP); Hitachi Car Engineering Co., Ltd., Hitachinaka (JP)

( * ) Notice: Subject to any disclaimer, the term of this patent is extended or adjusted under 35 U.S.C. 154(b) by 0 days.

(21) Appl. No.: 10/453,726

(22) Filed: Jun. 4, 2003

(65) Prior Publication Data

US 2003/0226551 A1 Dec. 11, 2003

(30) Foreign Application Priority Data

Jun. 5, 2002 (JP) ........................ 2002-163714

(51) Int. Cl.
*F02M 31/135* (2006.01)

(52) U.S. Cl. ....................... 123/545; 123/549

(58) Field of Classification Search ......... 123/543–557; 219/504, 505
See application file for complete search history.

(56) References Cited

U.S. PATENT DOCUMENTS

| | | | | | |
|---|---|---|---|---|---|
| 4,327,697 | A | * | 5/1982 | Wada et al. ................. | 123/549 |
| 4,366,798 | A | * | 1/1983 | Goto et al. ................. | 123/549 |
| 4,416,242 | A | * | 11/1983 | Kato et al. .................. | 123/549 |
| 4,425,899 | A | * | 1/1984 | Kato et al. .................. | 123/549 |
| 4,489,232 | A | * | 12/1984 | Wada et al. ................. | 219/506 |
| 4,870,249 | A | * | 9/1989 | Kayanuma et al. ......... | 219/206 |
| 5,401,935 | A | * | 3/1995 | Smith et al. ................. | 219/206 |
| 5,482,023 | A |   | 1/1996 | Hunt et al. |   |
| 6,109,247 | A | * | 8/2000 | Hunt .......................... | 123/549 |
| 6,279,549 | B1 | * | 8/2001 | Hunt et al. ................. | 123/549 |

* cited by examiner

*Primary Examiner*—Marguerite McMahon
(74) *Attorney, Agent, or Firm*—Crowell & Moring LLP

(57) ABSTRACT

A slit-shaped heater holder 54 outside the heat-exchanger tube 55 can eliminate the use of adhesive in the heater assembly. A flat electrode 53 which is pressed on and in surface contact with the PTC heater 53 can improve the wear resistance of the heater contact, prevent the PTC heater breaking, and even assure the electrical connecting to the broken PTC heater.

8 Claims, 8 Drawing Sheets

HEATER UNIT FOR A COMBUSTION-STABILIZING DEVICE AND A COMBUSTION STABILIZING DEVICE INCLUDING THE SAME

BACKGROUND OF THE INVENTION

The present invention relates to a fuel-injection device for an automobile internal-combustion engine and an internal-combustion engine where the fuel-injection device is installed, and to a technology suitable for reducing harmful substances such as HC exhausted from the internal-combustion engine.

Helping atomize the fuel spray injected from the fuel-injection valve and reducing fuel adhesion on an intake pipe inside can effectively help quickly start the internal-combustion engine, improve fuel economy, and clean up exhaust gases such as reducing HC. Atomizing the fuel spray can also stabilize the combustion.

Common method to supply highly atomized fuel spray into the internal-combustion engine includes the use of a fuel-injection valve to aid the start up of the internal-combustion engine. U.S. Pat. No. 5,482,023 describes a cold start fuel control system which includes a cold start fuel injector, heater, and idle speed control valve (hereinafter referred to as "ISC valve").

This system helps mix the fuel spray injected from a fuel-injection valve downstream of the ISC valve of the internal-combustion engine and an intake air through the ISC valve by swirling the spray and air. The system then heats and vaporizes the fuel-air mixture by applying the mixture to a heater downstream of the fuel-injection valve. The system thus helps mix the spray injected from the fuel-injection valve and the intake air, and helps heat and vaporize the mixture using the heater, thereby reducing the fuel adhesion on an intake pipe inside.

Conventional heaters, however, have a complex electrical connection, which gives a difficult heater assembly process and poor heater reliability.

SUMMARY OF THE INVENTION

The object of the present invention is to provide an improved heater used in the combustion-stabilizing device which applies a fuel spray injected from the fuel-injection valve to the heater downstream of the fuel-injection valve to vaporize the fuel and then supplies the vaporized fuel to an intake pipe having a throttle valve, thereby improving the heater assembly process and heater reliability.

Another object of the present invention is to provide a combustion-stabilizing device including the improved heater.

To achieve the above object, the present invention provides a heater unit for a combustion-stabilizing device comprising:

a grounded heat-exchanger tube having more than one outer flat surface for mounting heaters, and having an inner surface to be in contact with a fluid to be heated;

flat-plate heater elements provided on the more than one flat surface of the heat-exchanger tube such that negative electrodes of the heater elements being in contact with the more than one flat surface;

insulating heater-holding members forming, with the heat-exchanger tube, slits for inserting the heater elements; and an electrode-holding member inserted outside the heat-exchanger tube having the heater elements, for holding positive electrodes in contact with positive-electrode surfaces of the heater elements.

To achieve above another object, the present invention also provides a combustion-stabilizing device combining the above heater unit and a fuel-injection valve.

DESCRIPTION OF THE PREFERRED EMBODIMENTS

Figure 1:
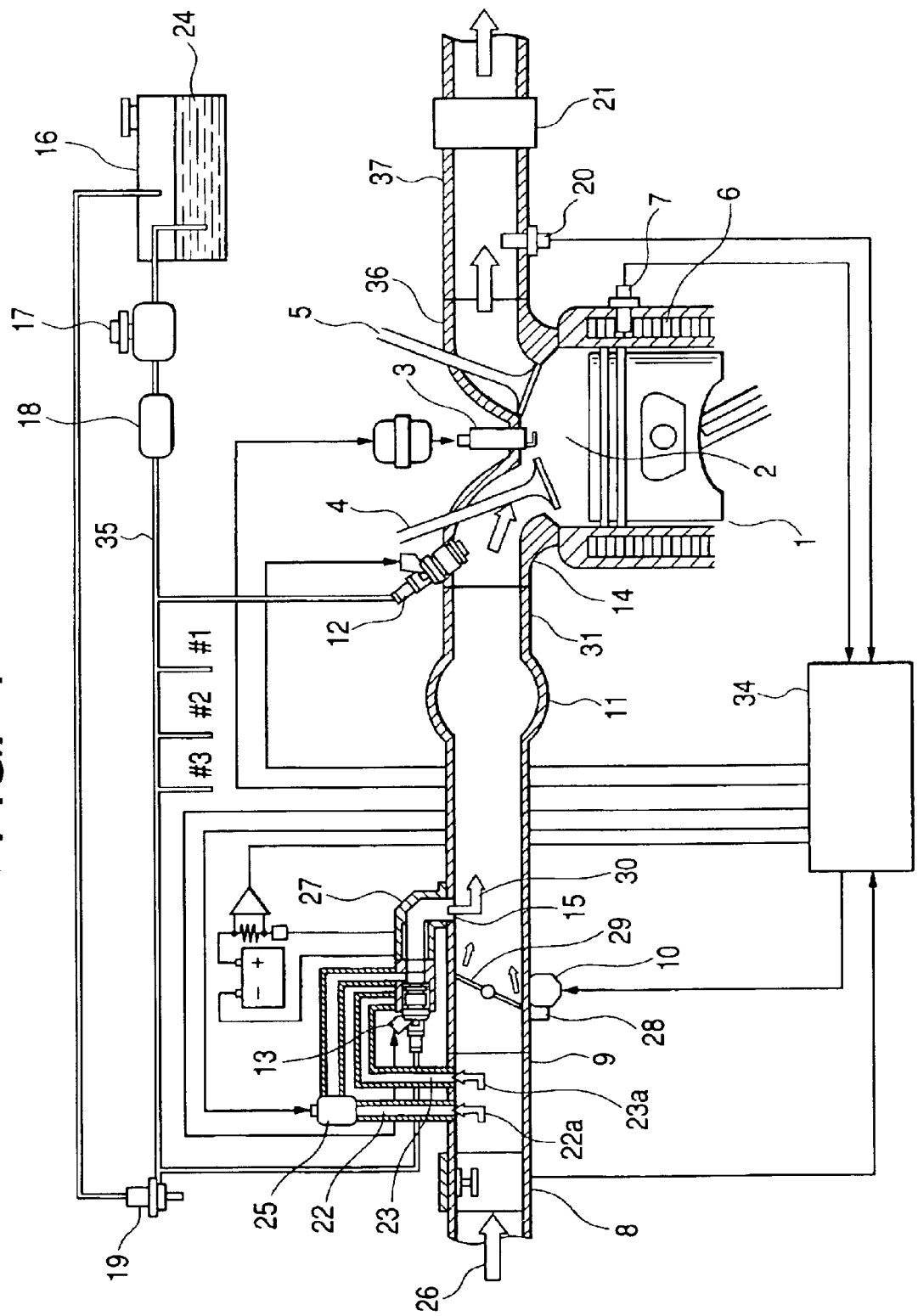
FIG. 1 is a configuration view showing a fuel-injection device and a system where the device is installed according to an embodiment of the present invention.

The characteristic configuration of the heater unit for the combustion-stabilizing device according to the present embodiment will be described below with referring to the symbols in figures.

The heater unit comprises a grounded heat-exchanger tube 55, which has more than one outer flat surface 55F for mounting heaters. The tube 55 also has an inner surface 55B to be in contact with a fluid to be heated (a fuel-air mixture, particularly the fuel fraction of the mixture).

The heater unit also comprises flat-plate heater elements (PTC heaters 53), which are provided on the flat surfaces 55F of the heat-exchanger tube 55 such that the negative electrodes of the heater elements are in contact with the flat surfaces 55F.

The heater unit also comprises insulating heater-holding members (heater holders 54), which form, with the heat-exchanger tube 55, slits 55D for inserting the heater elements (PTC heaters 53).

The heater unit also comprises an electrode-holding member (insulating thermal-insulation cover 56), which is inserted outside the heat-exchanger tube having the heater elements (PTC heaters 53), for holding the positive electrodes (flat electrodes 52) in contact with the positive-electrode surfaces of the heater elements (PTC heaters 53).

Specifically, the heater unit comprises the grounded metal housing (heater body 40). The assembly of the heat-exchanger tube 55 having the heater elements (PTC heaters 53) and the electrode-holding member (insulating thermal-insulation cover 56) is inserted into the metal housing (heater body 40). The heat-exchanger tube 55 and the metal housing (heater body 40) are electrically connected. The insulating electrode-holding member (insulating thermal-insulation cover 56) prevents the positive electrodes (flat electrodes 52) held by the electrode-holding member (insulating thermal-insulation cover 56) from contacting with the metal housing (heater body 40) and heat-exchanger tube 55.

The heater element (PTC heaters 53) consists of more than one heater modular (531, 532) inserted in the slit 55D. The positive electrode (flat electrode 52) comprises one electrode piece (flat electrode 52) common to these more than one heater modular (531, 532).

The positive electrode (flat electrode 52) consists of more than one electrode piece. Each electrode piece has a hook (52a) at one end. The electrode-holding member (insulating thermal-insulation cover 56) at one end is divided circumferentially into more than one protrusion 56B. Each hook (52a) catches each protrusion 56B to fasten each electrode piece. The electrode-holding member (insulating thermal-insulation cover 56) also has, at the other end, more than one electrode-receiving portion 56C, each of which has a groove. The other end of each electrode piece is inserted into and held by each groove.

The more than one electrode piece of the positive electrode (flat electrode 52) are electrically connected through a ring-shaped electrode (ring electrode 50) which is in contact with the outside of the each hook (52a) provided at one end of the each electrode piece.

The electrode-holding member (insulating thermal-insulation cover 56) is a cylindrical insulator (insulating thermal-insulation cover 56). The positive electrode (flat electrode 52) is provided on the inside of the electrode-holding member (insulating thermal-insulation cover 56). An elastic insulator (rubber elastic body 49) intervenes between the positive electrode (flat electrode 52) and the electrode-holding member (insulating thermal-insulation cover 56).

A first embodiment of the present invention will be described below with referring to FIGS. 1 to 5. FIG. 1 shows an internal-combustion engine 1, which is a gasoline-, fired, well-known ignition internal combustion engine. FIG. 1 shows only one cylinder on which attention is focused.

The internal-combustion engine 1 comprises an ignition plug 3 in the combustion chamber 2, an intake valve 4 for taking air and mixed air into a combustion chamber 2, and an exhaust valve 5 for exhausting gas after combustion. The internal-combustion engine 1 comprises a water temperature sensor 7 on the side of the ignition chamber 2 for detecting the temperature of an engine coolant 6, and a rotation sensor (not shown) for detecting the rotation number of the engine. Such sensors can detect the operating condition of the internal-combustion engine 1.

An intake system for taking air into the combustion chamber 2 comprises a mass airflow sensor 8, electronic throttle valve 10, throttle positioning sensor 28, intake manifold 11, intake manifold branch pipe 31, and intake port 14. The mass airflow sensor 8 can measure the intake air through an air cleaner (not shown). The electronic throttle valve 10 can electrically control the amount of the intake air. The valve 10 which opens/closes is connected to a rotating shaft which rotates in response to the driver's foot pressure on the gas pedal or to the operating condition of the internal-combustion engine. The intake manifold branch pipe 31 branches from the intake manifold 11 to each cylinder of the internal-combustion engine 1. The intake port 14 has the intake valve 4.

A controller 34 receives flow rate data of the intake air 26 from the air flow sensor 8 and opening data of a valve 29 of the electronic throttle valve 10 from the throttle positioning sensor 28. The controller 34 can use those date to detect and control the operating condition of the internal-combustion engine 1.

The fuel-injection device comprises a first fuel-injection valve 12 and a second fuel-injection valve 13. The first fuel-injection valve 12 connects to the intake port 14 to inject, downstream of the intake manifold 11, the fuel toward the intake valve 4 of each cylinder.

The combustion-stabilizing device 27 has the second fuel-injection valve 13. The second fuel-injection valve 13 enters the intake manifold 11 through a branch passage 15 opened downstream of the electronic throttle valve 10.

A fuel supply system comprises a fuel tank 16, fuel pump 17, fuel filter 18, pressure regulator 19, first fuel-injection valve 12, and second fuel-injection valve 13, all of which connect to each other via a fuel pipe 35. The fuel tank 16 contains a fuel 24. The fuel pump 17 can deliver the fuel 24 from the fuel tank 16. The pressure regulator 19 can regulate the pressure of the delivered fuel 24 at a predetermined value. The first fuel-injection valve 12 can inject the fuel into the intake port 14 of each cylinder (#1, #2, . . . ). The second fuel-injection valve 13 can supply the fuel downstream of the throttle valve 29.

An exhaust system comprises an exhaust port 36, exhaust manifold 37, oxygen concentration sensor 20, three way catalytic converter 21, and dissipative muffler (not shown). The exhaust port 36 has the exhaust valve 5 for each cylinder. The oxygen concentration sensor 20 can measure oxygen concentration in the exhaust gas. The three-way catalytic converter 21 can clean the exhaust gas. The controller 35 receives the oxygen concentration data from the oxygen concentration sensor 20 to use them to detect and control the operation condition of the internal-combustion engine 1.

The three way catalytic converter 21 can clean the NOx, CO, and HC at a high cleanup rate at the same time, which are exhausted from the internal-combustion engine 1 operated nearly at a theoretical air-fuel ratio.

The combustion-stabilizing device 27 connects to the branched passage 15 opened downstream of the electronic throttle valve 10. To send air measured by the mass airflow sensor 8 to the combustion-stabilizing device 27, bypass manifolds 22, 23 branch from the intake pipe 9 and bypass the electronic throttle valve 10 from upstream to downstream. The bypass manifold 22 is an air passage to carry the fuel 24 injected from the second fuel-injection valve 13. An idle speed control valve 25 on the bypass manifold 22 can control the airflow rate through the bypass manifold 22. The bypass manifold 23 is an air passage for an air-assist air, which helps atomize the fuel 24 injected from the second fuel-injection valve 13.

In the configuration mentioned above, the combustion chamber 2 receives the fuel-air mixture of the fuel 24 and the intake air 26 injected from the fuel-injection valves 12 and 13. The received mixture is compressed and ignited by the spark plug 3 to start the combustion. The exhaust gas from the internal-combustion engine 1 will escape into the atmosphere through the exhaust system.

Figure 2:
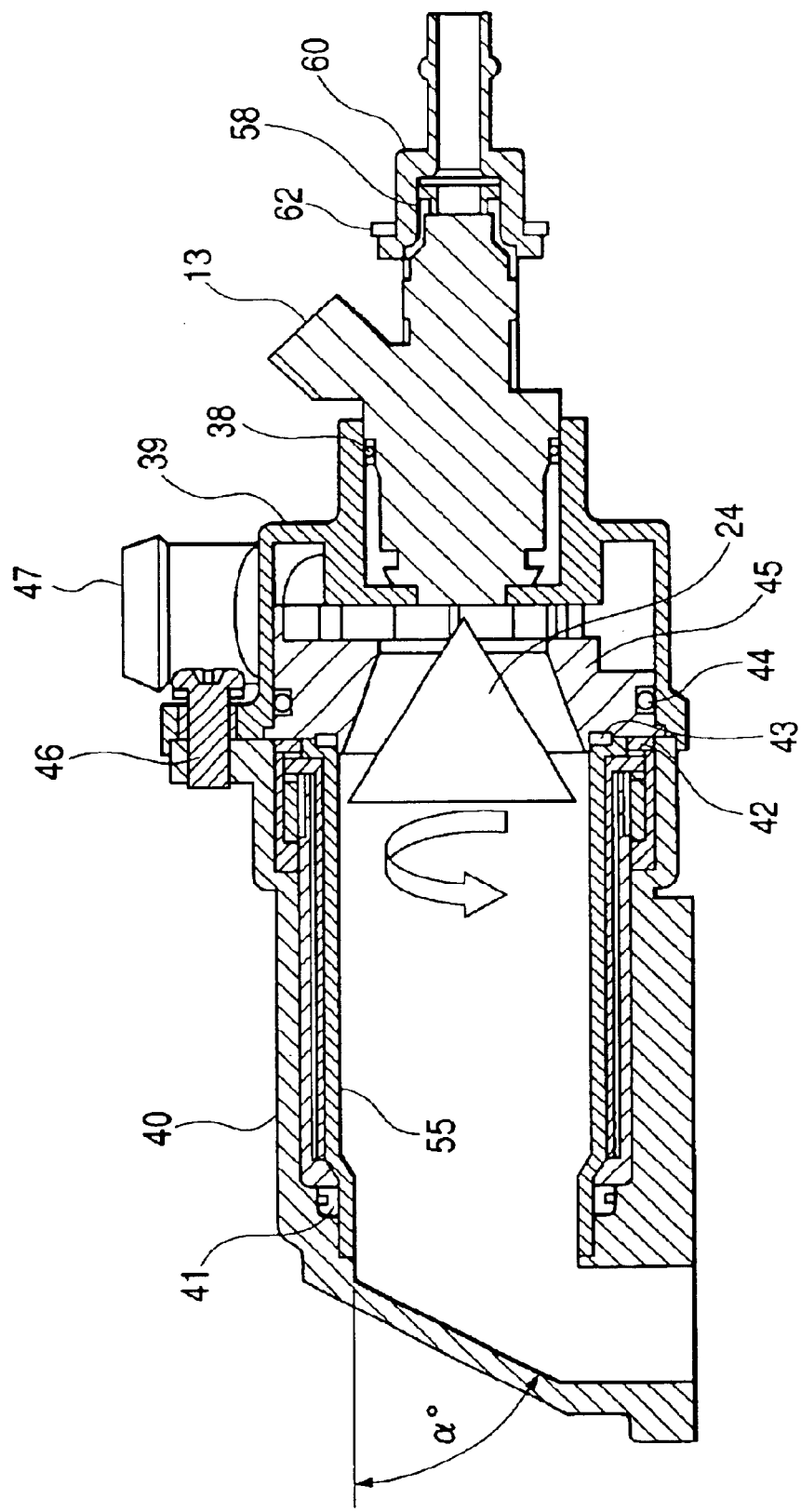
FIG. 2 a configuration view showing a combustion-stabilizing device according to an embodiment of the present invention.

Referring to FIG. 2, the combustion-stabilizing device 27 will be described.

FIG. 2 shows a cross-sectional view of the combustion-stabilizing device 27. The combustion-stabilizing device 27 includes a body 39 and a heater body 40. The body 39 is primarily provided with the second fuel-injection valve 13 and a carrier air feed pipe 47. The carrier air feed pipe 47 connects to the bypass manifold 22 and receives the carrier air 22a. The fuel-injection valve 13 is fastened on the body 39 by the fuel pipe 60 and a fuel pipe holding member 62. The fuel-injection valve 13 receives the fuel 24 through the fuel pipe 35 delivered by the fuel pump 17 from the fuel tank 16.

The heater body 40 contains a heater as described below. The heater body 40 has a positive electrode 48 and a negative electrode (body earth) to power the heater. The fuel 24 vaporizes in the heater body 40 and leaves the combustion-stabilizing device 27 as the vaporizing fuel 30 indicated by the open arrow.

Figure 3:
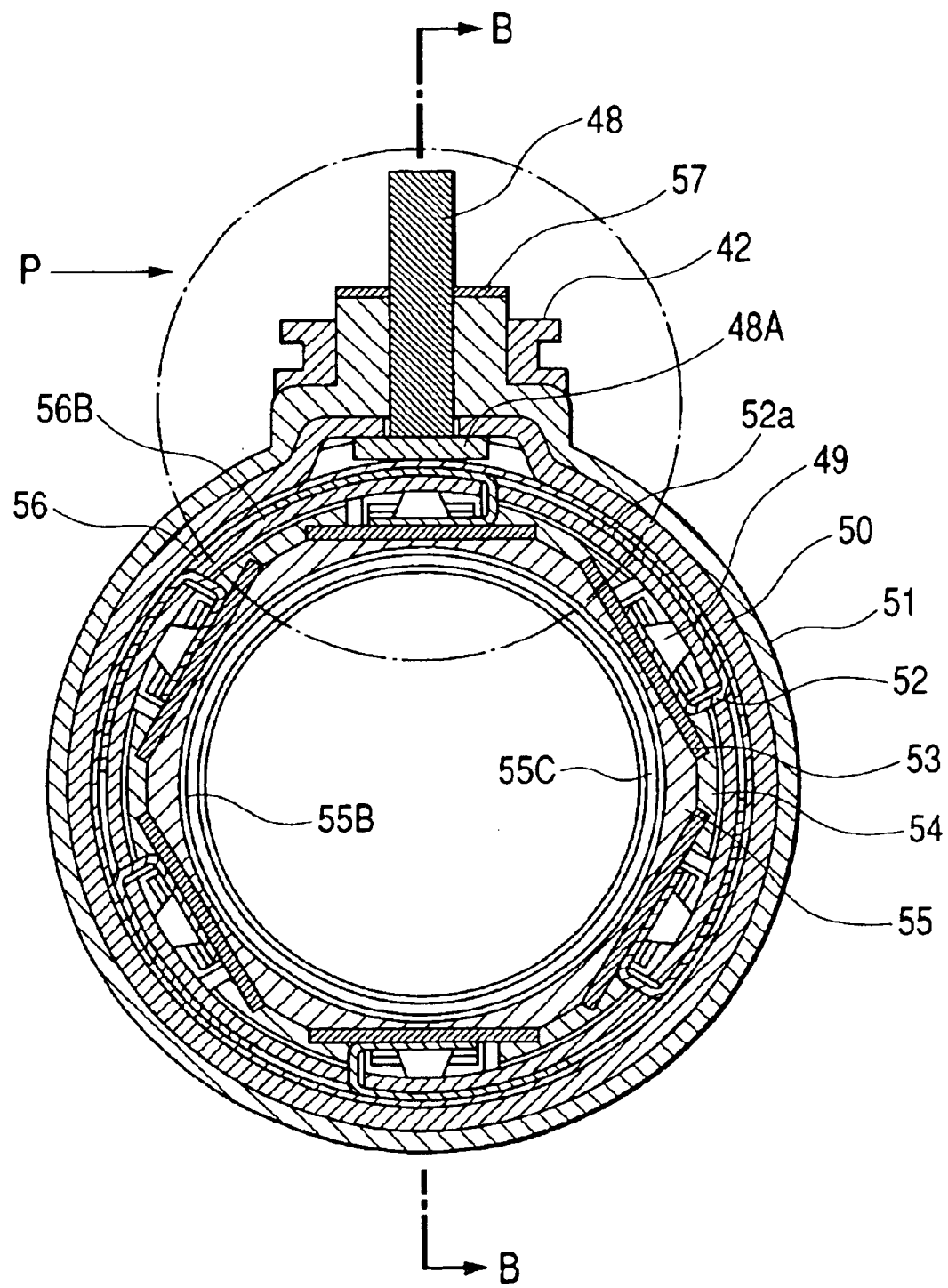
FIG. 3 is a cross-sectional view showing a heater according to the present invention.
Figure 4:
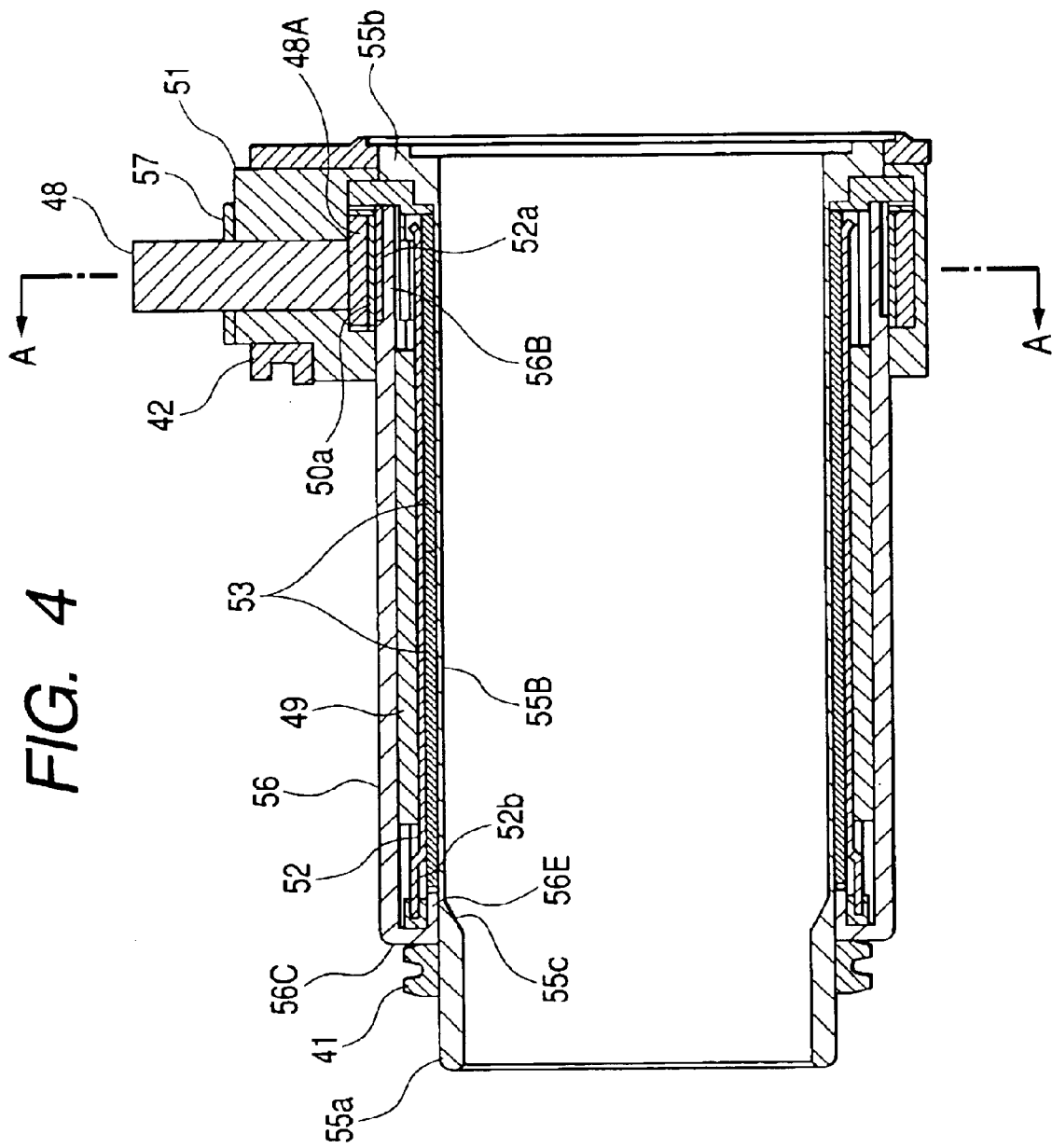
FIG. 4 is another cross-sectional view showing a heater according to the present invention.

FIG. 3 shows a cross-sectional view along A—A in FIG. 4. FIG. 4 shows a cross-sectional view along B—B in FIG. 3.

Figure 5:
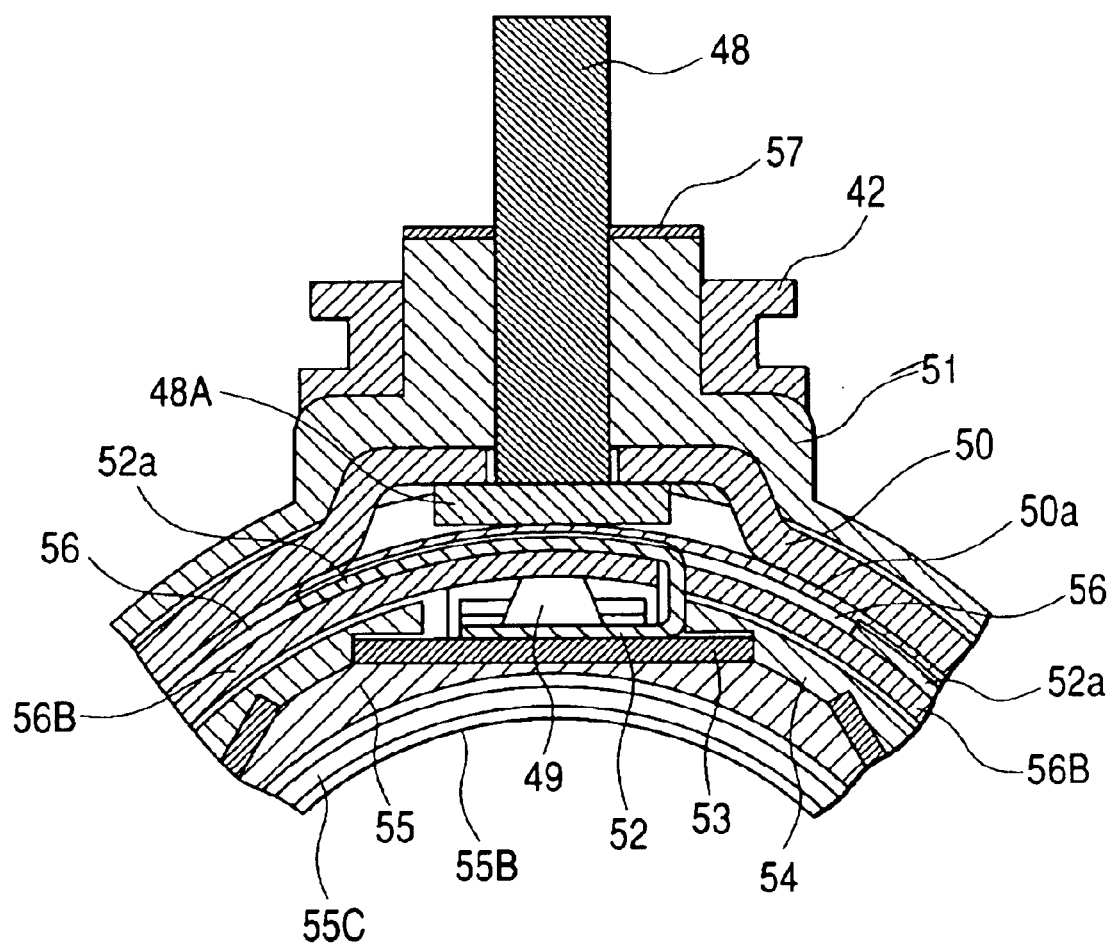
FIG. 5 is an enlarged cross-sectional view showing a heater according to the present invention.

FIG. 5 shows an enlarged cross-sectional view of portion P of FIG. 2.

The sub passage heat-exchanger tube 55 is formed inside the heater body 40 which has a deviation angle α° and is mounted on the branch passage 15 opened downstream of the electronic throttle valve 10. The plate-like heater (ceramic heater) outside the heat-exchanger tube 55 has upper and lower flat surfaces as electrodes (the upper is positive, the lower is negative). The heater will heat up when current passes through the electrodes. The heater of the present embodiment uses a PTC (Positive Temperature Coefficient Thermistor) heater 53, which, at temperatures greater than or equal to a predetermined value, can rapidly increase its resistance to decrease the current through it and keep its temperature constant.

PTC heater 53 fastens against the grounded heat-exchanger tube 55 and the flat electrode as the positive electrode. The insulating thermal-insulation cover 56 holds the flat electrode 52. The flat electrode 52 connects via ring electrodes 50, 50a to the positive electrode terminal 48 outside the heater body 40. The conductive heat-exchanger tube 55 presses on the metal heater body 40. The heater body 40 electrically connected to the automobile body can ground the heat-exchanger tube 55, which results in the negative electrode. The insulating heater holder 54 and insulating thermal-insulation cover 56 isolate the flat electrode 52 and heat-exchanger tube 55. When current passes through the electrode terminal 48 and heater body 40, the PTC heater 53 heats up to heat the transfer tube 55.

Seal rings 41, 42, and O-ring 43 can seal the sub passage heat-exchanger tube 55 from the internal passage. A mixer 45 and the body 39 are held between the seal ring 42 and O-ring 43 to seal the heat-exchanger tube 55. The mixer 45 is positioned such that O-rings 43, 44 can seal the internal passage.

The body 39 has the second fuel-injection valve 13, which is coaxial with the heater body 40. The second fuel injection valve 13 fastens on the body 39, which has the air inlet 47, via the O-ring 38 which seals the valve 13 from the outside. The fuel passage has an O-ring 58 between the fuel pipe 60 and fuel-injection valve 13. The fuel pipe holding member 62 (bracket) seals and fastens the fuel passage to the body 39.

More specific configuration and assembly method according to the present invention will be described below with referring to FIGS. 5 to 8.

Figure 6:
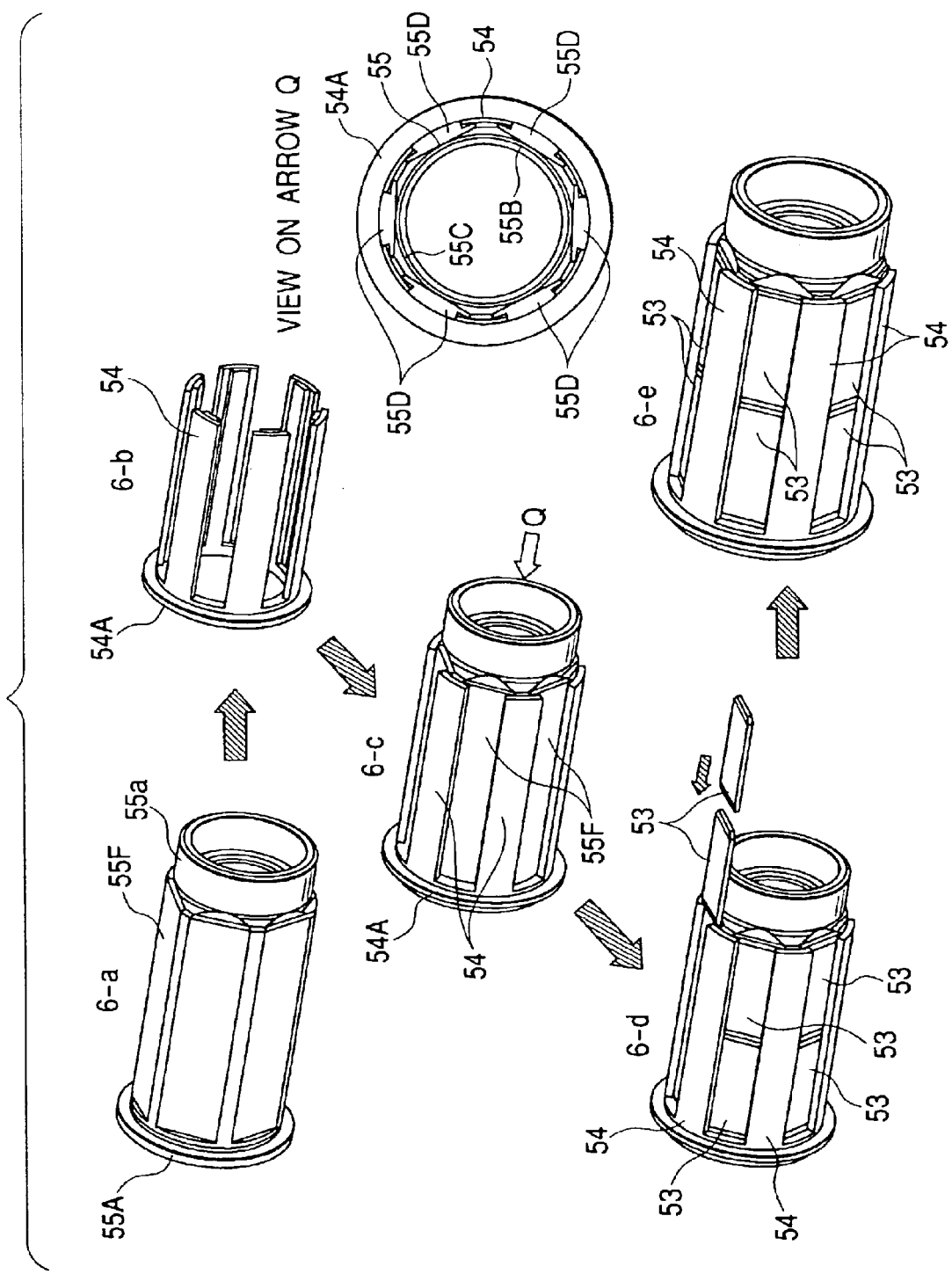
FIG. 6 is a configuration view showing a heater assembly according to an embodiment of the present invention.

FIG. 6 shows a configuration of the PTC heater assembly according to an embodiment of the present invention.

To mount the PTC heater 53 outside the heat-exchanger tube 55, the heat-exchanger tube 55 has an outer polygonal (preferably pentagonal or hexagonal) surface with axial flat surfaces and also has an insulating slit-shaped heater holder 54 outside the heat-exchanger tube 55 to guide the PTC heater 53.

The slit-shaped heater holder 54 is shown in the view on arrow Q. The slit-shaped holder 54 makes possible to mount more than one PTC heater axially outside the heat-exchanger tube 55 without any adhesive or solder. Heat insulation material used in the heater holder 54 can prevent heat dissipation to outside from the heater.

FIGS. 4 and 5 also show the electrode arrangement. The flat electrode 52 as the positive electrode and the more than one axially arranged PTC heater 53 are in contact to be flush with each other and are electrically connected. A rubber elastic body 49 is baked on the surface of the flat electrode 52 opposite the PTC heater 53. The insulating thermal-insulation cover 56 compresses the rubber elastic body 49 to press the flat electrode 52 on the PTC heater 53. The flat electrode 52 can increase the contact area with the PTC heater 53 so that it can electrically connect to the PTC heater 53 even when the heater 53 is broken.

The rubber elastic body 49 can absorb the thickness variation of the PTC heater 53, thereby increasing durability against vibration.

Figure 7:
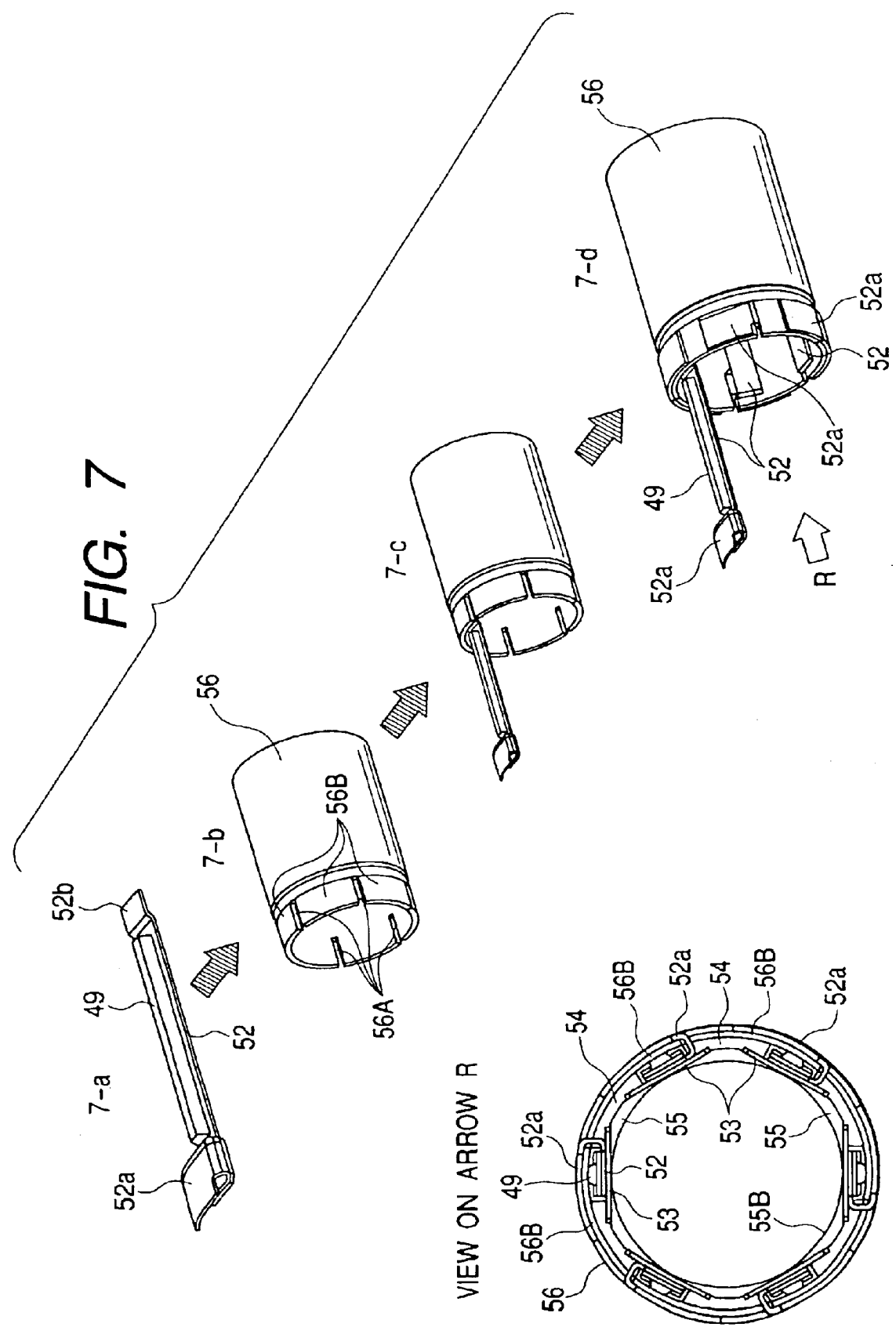
FIG. 7 is a configuration view showing a heater assembly according to an embodiment of the present invention.

FIG. 7 shows the positive electrode assembly according to an embodiment of the present invention.

The rubber elastic body 49 is baked on the top surface of the flat electrode 52.

The flat electrode 52 includes a hook 52a at one end and a stepped protrusion 52b at the other end, both of which can fasten the electrode 52 on the insulating thermal-insulation cover 56. The hook 52a can provide a contact area which can electrically connect more than one flat electrode 52 outside the heat-exchanger tube 55 to the ring electrode 50. The hook can also provide a guide to fasten the flat electrode 52 on the protrusion 56B of the insulating thermal-insulation cover 56.

The stepped protrusion 52b provides a guide to fasten the flat electrode 52 into the groove 56E in an electrode-receiving portion 56C, which is at the other end of the insulating thermal-insulation cover 56.

The flat electrode 52 can be assembled in the following steps: inserting the stepped protrusion 52b into the electrode-receiving portion 56C at the other end of the insulating thermal-insulation cover 56; and inserting the folded portion of the hook 52a into the slit 56A between the protrusions 56B, into which the insulating thermal-insulation cover 56 at one end is divided circumferentially, to catch the protrusion 56B with the hook 52a.

The flat electrode 52 mounted in the insulating thermal-insulation cover 56 is shown in the view on arrow R.

The insulating thermal-insulation cover 56 has slits for inserting more than one flat electrode 52. The flat electrode 52 is inserted into the slit with compressing rubber elastic body 49.

Figure 8:
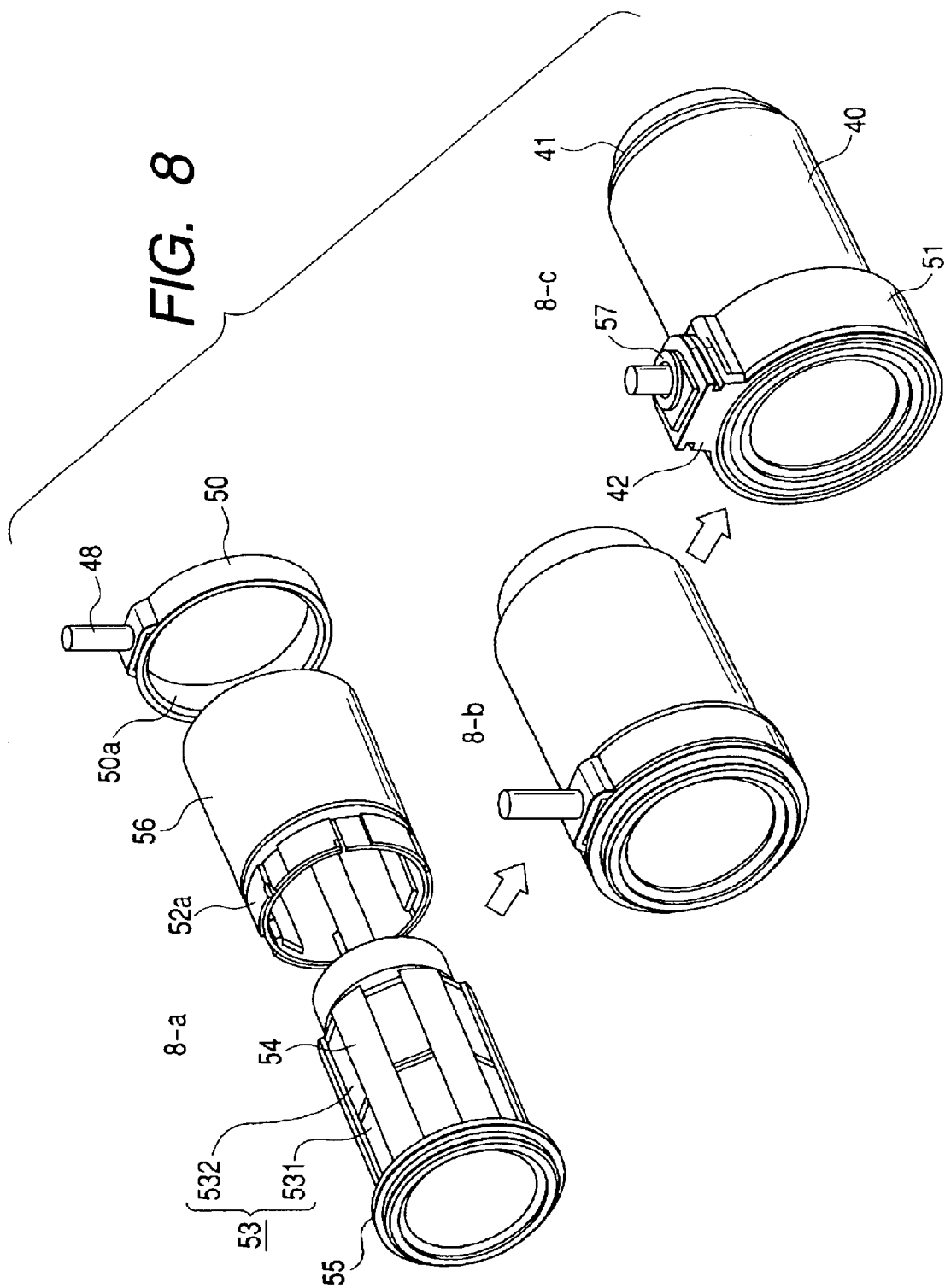
FIG. 8 is a configuration view showing a heater assembly according to an embodiment of the present invention.

FIG. 8 shows the heater assembly according to an embodiment of the present invention.

As shown in FIG. 8, inserting the assembly in FIG. 7-d into the assembly in FIG. 6-e can easily assemble the heater.

The ring electrodes 50, 50a with the positive electrode terminal 48 are pressed on the contact 52a of the same curvature radius as the insulating thermal-insulation cover 56 to electrically connect more than one flat electrode 52. The resin seals the pressed ring electrode 50. The seal rings 41, 43 and O-ring 42 seal the both ends 55a, 55b of the heat-exchanger tube 55.

The internal passage of the heat-exchanger tube 55 according to an embodiment of the present invention will be described below with referring to FIGS. 2 and 4.

The fuel 24 injected from the fuel-injection valve 13 attaches on the heat-exchanger tube 55. The heat-exchanger tube 55 transfers the heat from the PTC heater 53 to vaporize the attached fuel 24. The smaller diameter end 55c of the heat-exchanger tube 55 can prevent the unvaporized fuel 24 attached on the heat-exchanger tube surface from flowing into the intake manifold 11, when switching from the combustion-stabilizing device to the first fuel-injection valve 12 for MPI (Multi-Point Injection).

The present embodiment includes the following fundamental features.

The heater unit can be inserted into the fuel passage. The PTC heater holder makes possible to mount the heating element (PTC heater) outside the heat-exchanger tube without any adhesive or solder.

The heating element (PTC heater) is in surface contact with the electrode, and the compressed rubber elastic body presses the flat electrode on the heating element (PTC heater), thus improving the wear resistance and durability of the contact between the heating element (PTC heater) and the flat electrode. Although the heating element (PTC heater) is fragile, the flat electrode covering the entire heater can electrically connect to the heater even when the heater is broken. The inner stepped end of the heater can prevent the unvaporized fuel from flowing out.

Specifically, the slit-shaped heater holder 54 outside the heat-exchanger tube 55 can eliminate the use of adhesive in the heater assembly. The flat electrode 53 which is pressed on and in surface contact with the PTC heater 53 can improve the wear resistance of the heater contact, prevent the PTC heater breaking, and even assure the electrical connecting to the broken PTC heater. Thus the heater reliability can be improved.

The present invention includes the following embodiments, which are not described in the appended claims.

(1) The heater unit for a combustion-stabilizing device of claim 8, comprising: a heat-exchanger tube having a first electrode; more than one flat-plate heater being axially contact with the outer flat surface of the heat-exchanger tube; a second flat electrode outside the more than one flat-plate heater, the fist electrode and second flat electrode sandwiching the more than one flat-plate heater therebetween; a insulating thermal-insulation cover outside the second flat electrode; and a metal leaf spring between the second flat electrode and the insulating thermal-insulation cover.

(2) The heater unit for a combustion-stabilizing device, wherein a ring electrode is pressed on the more than one second flat electrode under the insulating thermal-insulation cover to electrically connect to the more than one second flat electrode.

The configuration of the present invention described above can provide automated heater assembly by mounting no artificially compressed component such as a spring, assembling every component by inserting it in the same direction, and using no welding or brazing to connect the electrodes.

The present invention can more easily electrically connect and fasten the heater, and improve the heater assembly process.

What is claimed is:

1. A heater unit for a combustion-stabilizing device a grounded heat-exchanger tube having more than one outer flat surface for mounting heaters, and having an inner surface to be in contact with a fluid to be heated;

flat-plate heater elements provided on said more than one flat surface of said grounded heat-exchanger tube such that negative electrodes of said flat-plate heater elements are in contact with said more than one flat surface;

insulating heater-holding member forming slit with said grounded heat-exchanger tube, said flat-plate heater elements being detachably inserted into the slit formed between said insulating heater-holding members and said grounded heat-exchanger tube;

an electrode-holding member mounted outside said grounded heat-exchanger tube having said flat plate heater elements, for holding positive electrodes in contact with positive-electrode surfaces of said heater elements; and a grounded metal housing, wherein the assembly of said heat-exchanger tube having said heater elements and said electrode-holding member is inserted into said metal housing, said heat-exchanger tube and metal housing are electrically connected, and said insulating electrode-holding member prevents said positive electrodes held by said electrode-holding member from contacting with said metal housing and heat-exchanger tube.

2. A heater unit for a combustion-stabilizing device according to claim 1, wherein said heater element includes more than one heater module inserted in said slit, said positive electrode comprises one electrode piece common to said more than one heater module.

3. A heater unit for a combustion-stabilizing device according to claim 1, wherein said positive electrode consists of more than one electrode piece, each electrode has a hook at one end, said electrode-holding member at one end is divided circumferentially into more than one protrusion, each hook catches each protrusion to fasten each electrode piece, said electrode-holding member has at the other end more than one electrode-receiving portion, each of which has a groove, and the other end of each electrode piece is inserted into each groove and held.

4. A heater unit for a combustion-stabilizing device according to claim 3, wherein the electrode pieces of the positive electrode are electrically connected through a ring-shaped electrode which is in contact with the outside of each of said hook at one end of said electrode piece.

5. A heater unit for a combustion-stabilizing device according to claim 1, wherein said electrode-holding member is a cylindrical insulator, said positive electrode is provided on the inside of said electrode-holding member, and an elastic insulator is provided between said positive electrode-holding member.

6. A heater unit for a combustion-stabilizing device comprising:

a grounded heat-exchanger tube having more than one outer flat surface for mounting heaters, and having an inner surface to be in contact with a fluid to be heated;

flat-plate heater elements provided on said more than one flat surface of said grounded heat-exchanger tube such that negative electrodes of said flat-plate heater elements are in contact with said more than one flat surface;

insulating heater-holding members forming slit with said grounded heat-exchanger tube, said flat-plate heater elements being detachably inserted into the slit formed between said insulating heater-holding members and said grounded heat-exchanger tube and an electrode-holding member located outside said grounded heat-exchanger tube having said flat plate heater elements, for holding positive electrodes in contact with positive-electrode surfaces of said heater elements, wherein said positive electrode consists of more than one electrode piece, each electrode has a hook at one end, said electrode-holding member at one end is divided circumferentially into more than one protrusion, each hook catches each protrusion to fasten each electrode piece, said electrode-holding member has at the other end more than one electrode-receiving portion, each of which has a groove, and the other end of each electrode piece is inserted into each groove and held.

7. A heater unit for a combustion-stabilizing device according to claim 6, wherein the more than one electrode piece of the positive electrode are electrically connected through a ring-shaped electrode which is in contact with the outside of each of said hook at one end of said electrode piece.

8. A heater unit for a combustion-stabilizing device comprising:

a grounded heat-exchanger tube having more than one outer flat surface for mounting heaters, and having an inner surface to be in contact with a fluid to be heated;

flat-plate heater elements provided on said more than one flat surface of said grounded heat-exchanger tube such that negative electrodes of said flat-plate heater elements are in contact with said more than one flat surface;

insulating heater-holding members forming slit with said grounded heat-exchanger tube, said flat-plate heater elements being detachably inserted into the slit formed between said insulating heater-holding members and said grounded heat-exchanger tube; and an electrode-holding member located outside said grounded heat-exchanger tube having said flat plate heater elements, for holding positive electrodes in contact with positive-electrode surfaces of said heater elements, wherein said electrode-holding member is a cylindrical insulator, said positive electrode is provided on the inside of said electrode-holding member, and an elastic insulator intervenes between said positive electrode and electrode-holding member.

* * * * *